UNITED STATES PATENT OFFICE.

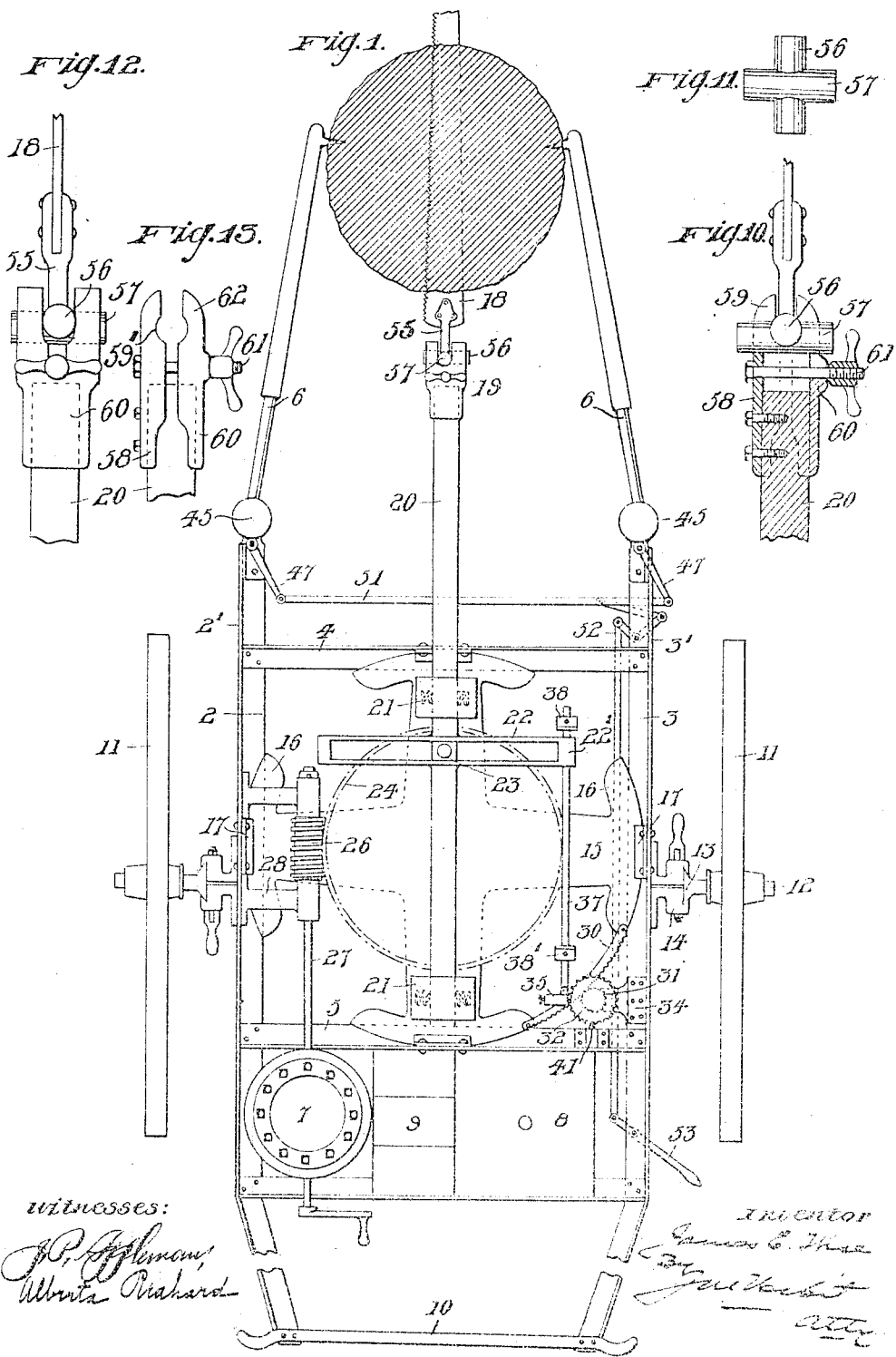

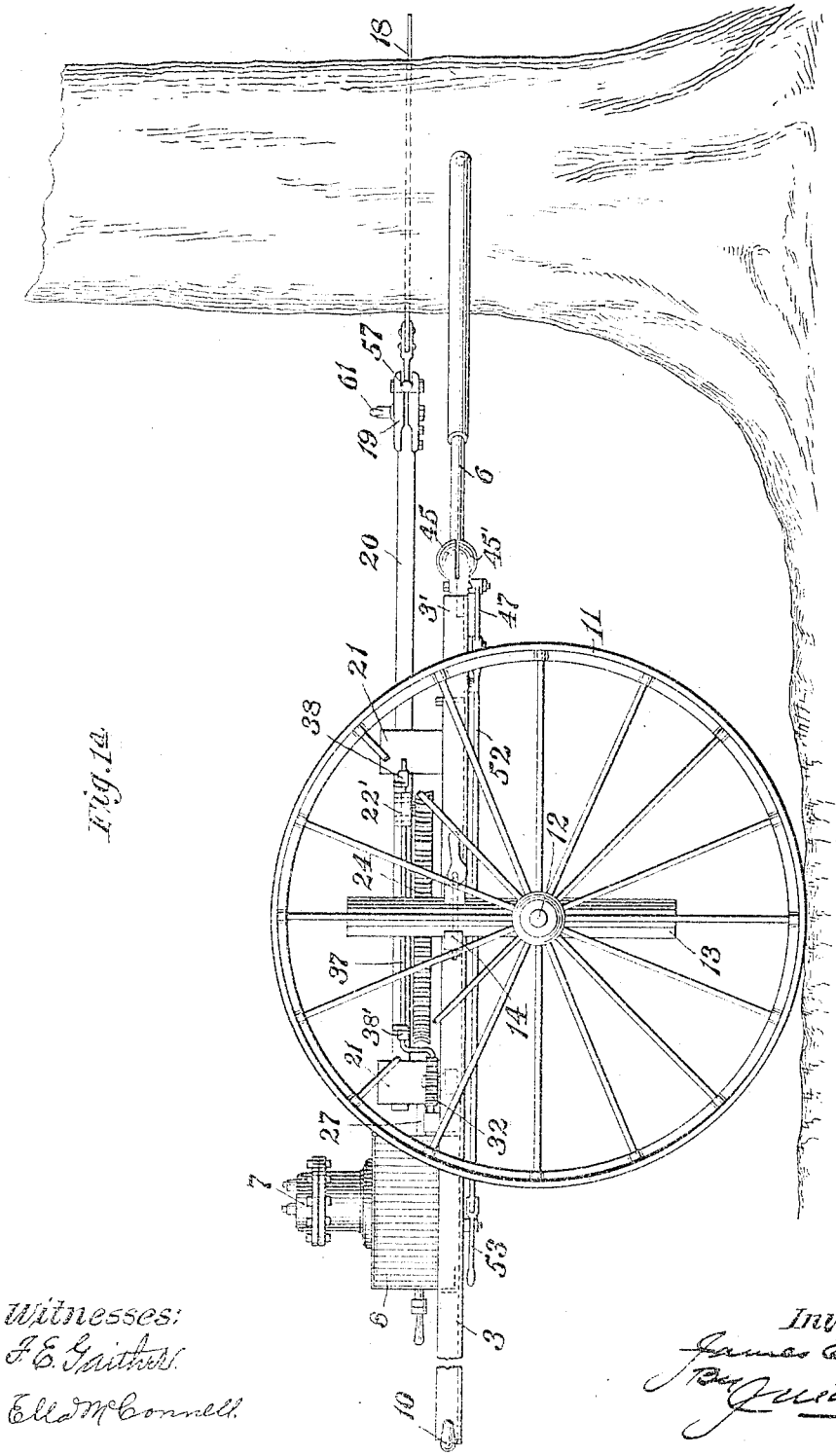

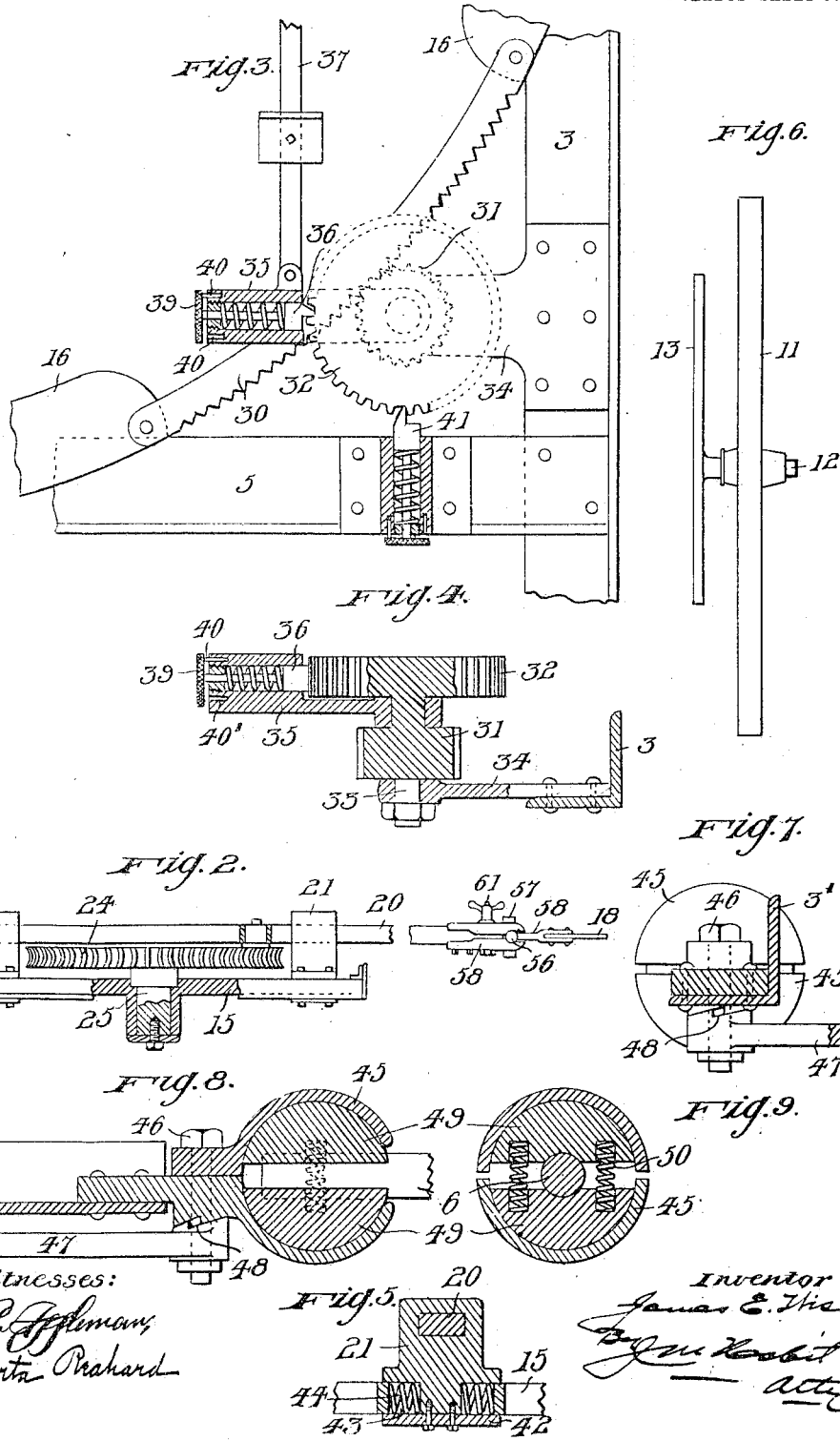

JAMES E. WISE, OF BUTLER, PENNSYLVANIA.

MACHINE FOR FELLING TREES.

957,832. Specification of Letters Patent. Patented May 10, 1910.

Application filed June 3, 1909. Serial No. 499,897.

*To all whom it may concern:*

Be it known that I, JAMES E. WISE, a resident of Butler, in the county of Butler and State of Pennsylvania, have invented certain new and useful Improvements in Machines for Felling Trees, of which the following is a specification.

The object of this invention is to provide a portable motor driven machine for felling trees, and subsequently cutting them into lengths, as required. This work is usually done with manually operated saws and is very laborious, so much so that it is frequently difficult in lumber camps to induce men to keep at it for any length of time.

I am not aware that prior to my invention a practical motor driven machine has been proposed, a machine possessing the necessary qualities of portability and adjustment requisite for varying conditions, and ready manipulation. These essentials have been borne in mind in designing the present machine, and the same is believed to meet all practical requirements.

In the accompanying drawings, Figure 1 is a top plan of the improved machine. Fig. 1ᵃ is a side elevation. Fig. 2 is a vertical cross-section of a portion of the table and driving gearing. Fig. 3 is a detail of the ratchet mechanism for turning the table, and Fig. 4 is a section of the same. Fig. 5 is a detail of one of the ram guides carried by the table. Fig. 6 is a detail of one of the ground wheels and the axle-carrying bar for connecting with the frame. Figs. 7, 8 and 9 are details of the adjustable connections of the tree-engaging dogs with the frame. Figs. 10, 11, 12 and 13 are details of the connection between the saw and ram.

Referring to the drawings, 2 and 3 designate the side members of a rectangular frame, and 4 and 5 the front and rear transverse members, all of said members being formed preferably of angle iron and securely riveted together. Members 2 and 3 project forwardly at 2', 3' for carrying the clamp devices which secure the tree-connecting dogs 6, as will presently be described. An extension of the frame rearward from bar 5, provides space for engine 7, a gasolene tank 8, and batteries 9. Handle bar 10 may be projected from this frame extension for moving the machine from place to place like a push cart.

The ground wheels 11 at either side of the frame have their axles 12 projecting from the vertical dovetail bars 13 adjustable in clamps 14 on frame bars 2 and 3. By this means the frame may be leveled however irregular the ground, either wheel being adjusted upward or downward, as required. The machine is thus adapted for operating on the side of a hill as well as on level ground.

Within the portion of the frame inclosed by bars 2, 3, 4 and 5 is a table 15 provided with segmental projections 16 which rest and turn on the frame bars, being held in place by stops 17.

18 is the saw connected by clamp 19 with the forward end of ram-forming bar 20. This bar reciprocates in guides 21 carried by table 15, the guides having slight spring-opposed lateral movement for the purpose hereinafter described.

Ram 20 is formed with cross-head 22 and operating therein is wrist or crank 23 of gear wheel 24. This wheel has its bearing 25 in the center of table 15, and its periphery is toothed to mesh with worm 26 on drive shaft 27 of engine 7, said shaft being mounted in brackets 28, projecting from frame bar 2. From the foregoing it will be understood that the rotation of wheel 24 through the medium of shaft 27 transmits reciprocating motion through wrist 23 and cross-head 22 to ram 20 and the saw.

The mechanism for moving the saw laterally and thereby holding it to its work when felling a tree, as in Fig. 1, will now be described. Two of table segments 16 are connected by the curved rack 30 and meshing therewith is pinion 31. Above this pinion and turning therewith is ratchet wheel 32, said wheel and ratchet being mounted on spindle 33 journaled in bracket 34 projecting from frame bar 3. 35 is an arm which swings loosely on spindle 33 and carries the beveled spring-dog 36 which engages ratchet 32. A rod 37 extends forwardly from arm 35 and through eye 22' on one extremity of cross-head 22. Carried by rod 37 are stops 38 and 38' which are engaged by the cross-head as the latter approaches the forward and backward limits of its stroke, and are adjustable to vary the throw, as required. Arm 35 is thus oscillated, its movement in one direction advancing ratchet 32 and pinion 31 and imparting a corresponding turning movement to table 15, while the movement in the opposite direction is idle and simply serves to give dog 36 a new hold. The saw operating mechanism is thus caused to automatically turn table 15 step by step and thereby feed the saw to the work. When the saw is operating in a reverse direction, the feed may be reversed by simply retracting cap 39 carried by the stem of the dog, the latter being held in either position required by pin 40 engaging one or the other of cavities 40' in arm 35. Between the intermittent movements above described the mechanism is held fixed by spring dog 41 secured to the frame, said dog being of the same construction as dog 36 and reversible in the same manner for either right or left-hand work.

Each of the ram guides 21 is movable laterally within a slot 42 on table 15, the guide being held in place by bottom plate 43, and the movement in either direction being opposed by one or the other of springs 44 confined within the slot. This compensation prevents injury to the saw in case the feed is too rapid or whenever any other condition may arise which would result in breaking either the saw or other parts of the mechanism in the absence of such yielding movement.

Dogs 6 are provided for holding the machine in operative position with relation to the tree the spiked ends of the dogs being driven into opposite sides thereof, as shown. The clamps which secure the dogs to the frame are of ball and socket form, each consisting of a two-part socket 45, 45', secured by bolt 46 to frame extension 2' or 3', as the case may be. Turning on each of these bolts is an arm 47, and this arm and socket member 45' are formed with coöperating cam faces 48, so that when the arm is turned in one direction the socket parts are loosened and when turned in the opposite direction said parts are tightened or closed together.
Operative within the socket is the two-part ball-member 49, the parts recessed on their adjacent faces to receive the extremity of dog 6, with spring 50 confined within cavities in the adjacent faces which resist movement of the ball members toward each other and operate to spread apart the socket members when the cam faces 48 are turned to permit of such movement. After the dogs have been fastened to the tree and their angular relation with the frame determined, the necessary range of adjustment being afforded by the ball and socket joints, the clamps are tightly closed by the turning of arms 47, thereby securely confining the extremities of the dogs. Arms 47 may be connected by link 51, and this link may in turn be connected with a rod 52 extending to the rear of the machine and operated by handle 53. This means for simultaneously operating the clamps is particularly desirable in affording a quick release of the machine when necessary to clear it from a falling tree. In such emergency, handle 53 may be operated to loosen the clamps for both dogs so that the clamps and the machine may be withdrawn, leaving the dogs fast to the tree trunk.

Shank 55 of saw 18 is formed with a cross-shaped head, providing trunnions 56 and 57 disposed at right angles to each other, and with their axial centers out of line, so that trunnion 57 is offset slightly from trunnion 56. Clamp 19 consists of a lower part 58 secured to and projected forward from ram 20, with the projecting portion bifurcated to form a vertical opening extending inwardly, as indicated at 59, and with the upper faces of the bifurcated parts formed with rounded depressions 59'. The upper part 60 of the clamp is secured by bolt 61, and when the bolt is loosened is adapted to slip back over the extremity of the ram. The extended portion 62 of member 60 is bifurcated and on its under face shaped complementary with member 58. Thus, the two members operate to secure either trunnion 56 or 57, with the other trunnion located in the bifurcations of the clamp parts.

With the saw in horizontal position for sawing down trees, as in Figs. 1, 2 and 10, trunnion 56 is confined between the clamp members and offset trunnion 57 bearing against the rear of the bifurcations. The saw is thus immovably held and is rigid with the ram.

With the saw arranged to make a vertical cut, as in Fig. 12, for sawing fallen trees, etc., trunnion 57 is confined within the clamp, and the slightly forward position of trunnion 56 permits the saw slight vertical swing, sufficient to permit it to follow downward through the cut. The clamp and the double-trunnioned shank-head combine to securely hold the saw for either horizontal or vertical cutting, and the machine is thus adapted for both classes of work. It will of course be understood that dog arms 6 may be turned in their sockets as required for either sawing position.

A machine thus constructed provides for every adjustment and manipulation necessary for a motor-driven tree-sawing mechanism. It is readily portable, and the adjustable ground wheels provide for leveling the mechanism on uneven ground.

I claim:—

1. In a portable tree sawing machine, the combination of a frame, ground wheels at opposite sides of the frame, tree engaging dogs projecting forwardly from the front end of the frame, a motor mounted on the rear end of the frame, a table movable horizontally on the frame between the ground wheels, guides on the table, a ram mounted to reciprocate on the table, means connecting the motor and ram, and table moving means.

2. In a tree sawing machine, the combination of a frame, ground wheels at opposite sides of the frame, a table on the frame between the ground wheels and mounted to turn on a vertical axis, a power transmitting wheel journaled on the table, a ram mounted to reciprocate on the table, a saw secured to the ram, an operative connection between the power transmitting wheel and the ram, power means for driving said wheel, and table moving means.

3. In a tree sawing machine, the combination of a frame, a table mounted in the frame on a vertical axis, a power transmitting wheel mounted on the table on a vertical axis coincident with the table axis, a ram mounted to reciprocate on the table, a cross-head and wrist-pin connection between the ram and said wheel, a saw secured to the ram, means for driving said wheel, and table turning means.

4. In a portable tree sawing machine, the combination of a horizontal frame, ground wheels at opposite sides of the frame, a horizontal table rotatably mounted on the frame between the ground wheels, a horizontal gear wheel having its axis coincident with the table axis, a motor mounted on the frame, a power shaft extending from the motor and geared to said gear wheel, a ram mounted to reciprocate on the table, a cross-head and wrist-pin connection between the ram and said gear wheel, a saw secured to the ram, and table turning means.

5. A sawing machine comprising a frame, a table rotatable therein, mechanism for imparting a step by step rotary movement to the table, a saw, a saw actuating member mounted to reciprocate on the table, and means for reciprocating said member.

6. A sawing machine comprising a frame, a table rotatable therein, a saw, a saw actuating member mounted to reciprocate on the table, means for reciprocating said member, and mechanism actuated by the reciprocating member for imparting a step by step rotary movement to the table.

7. In a sawing machine, a saw, a saw reciprocating member, mechanism for moving said member laterally as the work progresses, and a yielding connection between the laterally movable mechanism and the saw reciprocating member.

8. In a tree sawing machine, the combination of a frame, a table movable horizontally therein, table moving means, a ram, guides movably mounted on the table in which the ram reciprocates, springs opposing movement of the guides relatively to the table, a saw secured to the ram, ram actuating means, and table moving means.

9. A sawing machine comprising a portable frame, a table mounted to turn therein, a saw, a ram secured to the saw, laterally movable cushioned guides on the table in which the ram moves, means for actuating the ram, and means for turning the table for the purpose of moving the ram and saw laterally as the work proceeds.

10. A sawing machine comprising a frame, a table mounted to turn therein, a driving wheel concentric with the table, a motor mounted on the frame and geared to the driving wheel, a saw, a ram connected to the saw and mounted to reciprocate on the table, the ram having a cross-head, a crank connection between the driving wheel and the cross-head, and means actuated by the ram for turning the table within the frame.

11. A sawing machine comprising a frame, a table rotatable therein, a rack carried by the table, a reciprocating member having a reversible ratchet connection with the table whereby a step by step movement in either direction may be imparted to the latter, a reversible saw, and a saw actuating member mounted to reciprocate on the table.

12. A sawing machine comprising a frame, a table mounted to turn within the frame, a saw, a saw actuating member mounted to reciprocate on the table, a motor mounted in the frame, gearing connecting the motor and the saw reciprocating member, ratchet mechanism for imparting a step by step movement to the table, and means actuated by the motor for operating the ratchet mechanism.

13. In a tree sawing machine, the combination of a frame, a table rotatable therein on a horizontal axis, ratchet mechanism for turning the table step by step, a ram mounted to reciprocate on the table, a saw secured to the ram, and means actuated by the ram for operating the ratchet mechanism.

14. In a sawing machine, a frame, a table having segmental peripheral projections bearing in the frame, a saw, saw reciprocating member mounted to reciprocate on the table, a motor, gearing connecting the motor and the saw-reciprocating member, and mechanism actuated by the motor for imparting intermittent movement to the table.

15. In a portable tree sawing machine, the combination of a horizontal frame, two ground wheels—one at each side of the frame, vertically adjustable means for securing each wheel to the frame, a table movable horizontally in the frame, a ram mounted to reciprocate on the table, ram reciprocating means, and table moving means.

16. In a sawing machine, a frame, a table rotatable in the frame, means for rotating the table, a ram slidably mounted on the table, a gear wheel concentric with the table and provided with a crank, a cross-head carried by the ram and recessed longitudinally to receive said crank, a saw secured to the ram, and means for rotating the gear wheel.

17. In a tree sawing machine, the combination of a portable frame, a saw, saw actuating means mounted on the frame, tree engaging dogs extending from the frame, clamps on the frame removably holding the dogs, and operating means connected to both clamps for operating them simultaneously to release the dogs.

18. In a sawing machine, a portable frame, a saw, saw actuating mechanism mounted in the frame, tree engaging dogs, clamps for securing the dogs to the frame with the dogs free to separate therefrom when the clamps are released, and clamp actuating means mounted on the frame, whereby when the clamps are released the frame and saw may be removed from a tree with the dogs remaining fast to the latter.

19. The combination of the frame of a sawing machine, a two-part spherical clamp secured to the frame with means for drawing the parts together, two semispherical members within the clamp and recessed to embrace the shank of a tree engaging dog, and a dog having its shank removably entered between said semispherical members.

20. The combination of the frame of a sawing machine, a two-part spherical clamp secured to the frame with means for drawing the parts together, two semispherical members rotatable within the clamp and recessed to receive the shank of a tree engaging dog, springs for opposing movement of the semispherical members toward each other, and a dog having its shank entered between said members and removably secured by contraction of the clamp parts.

21. In a tree sawing machine, the combination of a ram, ram reciprocating means, a clamp adapted to open and close and having vertical and horizontal intersecting passageways, a saw, and a cross-shaped head secured to the saw with the arms thereof fitting the clamp passageways interchangeably.

22. In a sawing machine, a ram, means for reciprocating the ram, a clamp secured to the ram and consisting of two parts with a clamping space therebetween, the clamp parts bifurcated to form a space intersecting the clamping space, a saw, and trunnions secured to the saw and disposed at right angles to each other, whereby either trunnion may be secured in the clamping space with the other trunnion in the space formed by the bifurcation.

23. In a sawing machine, a ram, means for reciprocating the ram, a clamp secured to the ram and consisting of two parts one above the other with a clamping space therebetween, the clamp parts bifurcated to form a vertical space intersecting the clamping space, a saw, trunnions secured to the saw and disposed at right angles to each other with one trunnion offset from the other trunnion, for the purpose described, whereby either trunnion may be secured in the clamping space with the other trunnion in the space formed by the bifurcation.

In testimony whereof I affix my signature in presence of two witnesses.

JAMES E. WISE.

Witnesses:
 CHAS. A. McELRAM,
 WILLIAM WALKER.